3,692,606
METHOD OF ELECTROSTATICALLY DEPOSITING PARTICLES ONTO THE TRAILING EDGE OF A SUBSTRATE
Emery P. Miller and Richard O. Probst, Indianapolis, Ind., assignors to Ransburg Electro-Coating Corporation, Indianapolis, Ind.
Filed Mar. 28, 1969, Ser. No. 811,549
Int. Cl. B05b 5/00
U.S. Cl. 156—151                   14 Claims

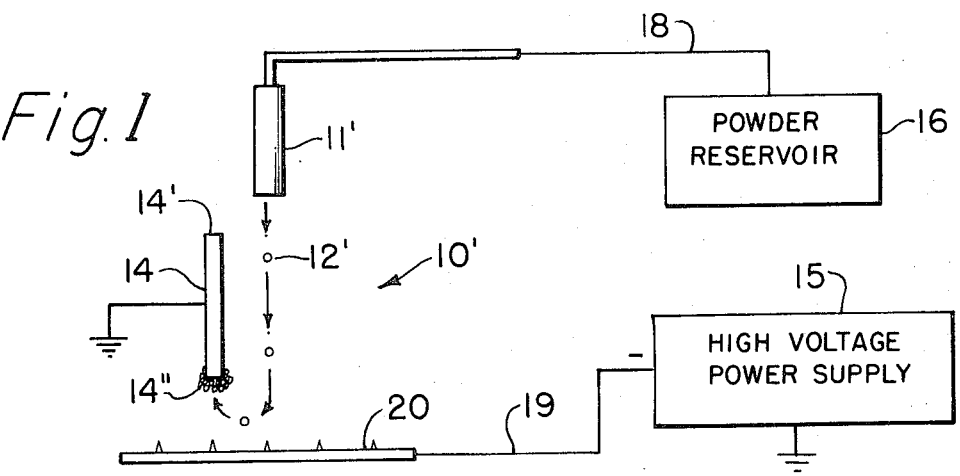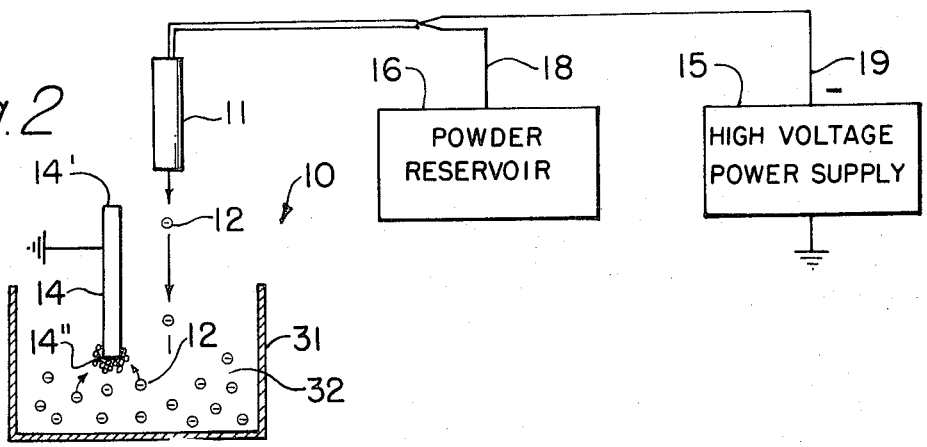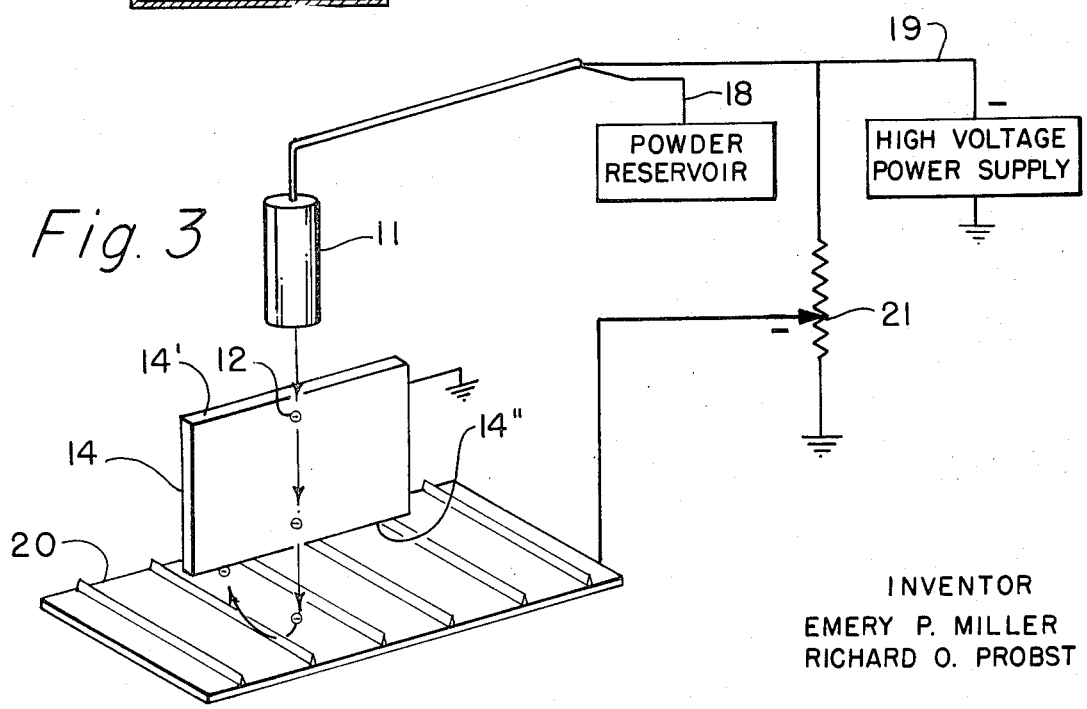

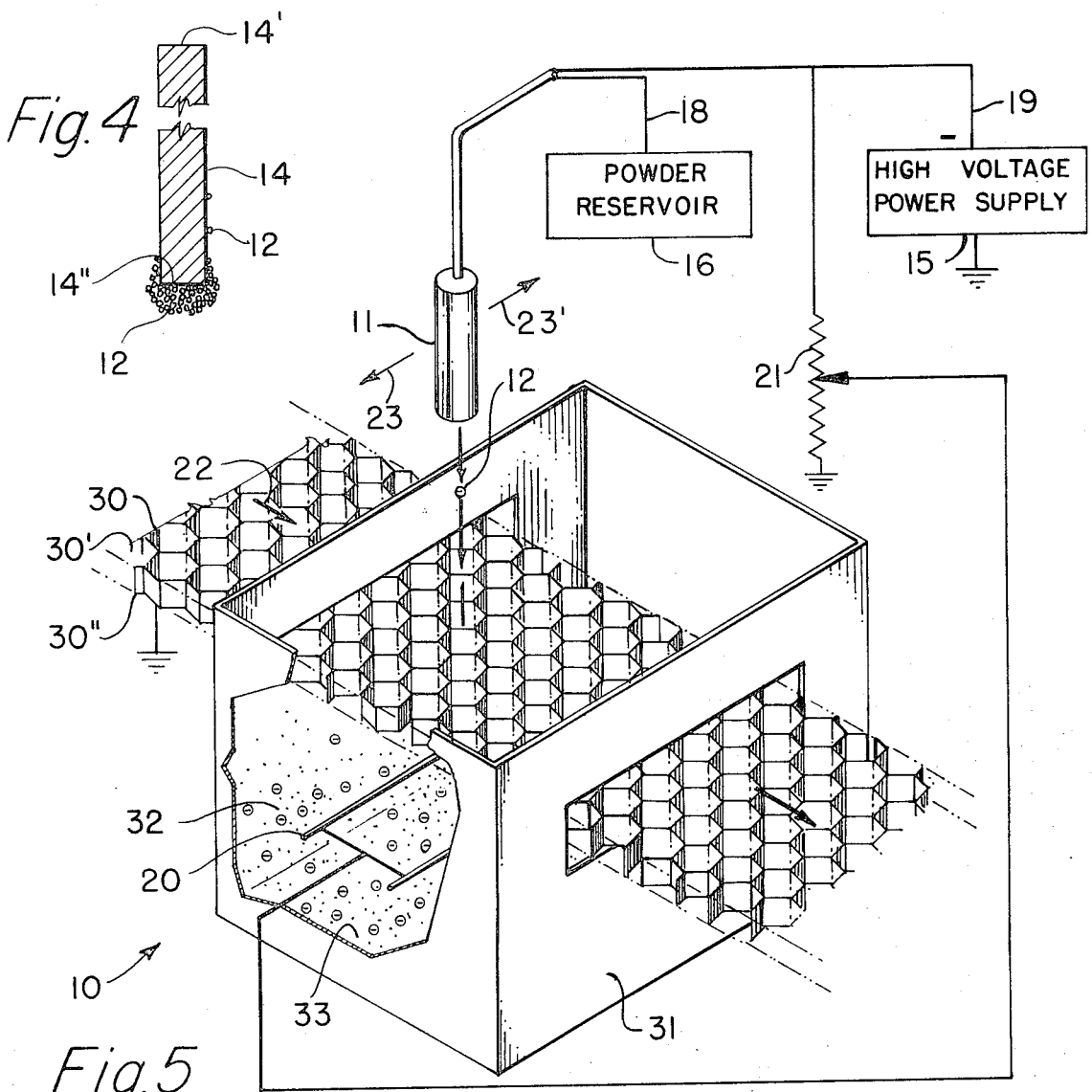

ABSTRACT OF THE DISCLOSURE

An apparatus and a method for depositing charged particles of a powdery substance onto an edge of a substrate. The apparatus may include means for emitting particles of a powdery substance toward the substrate. Substantially all of the particles are propelled beyond a leading edge of the substrate to the vicinity of a trailing edge of the substrate. Another means is adjacent the trailing edge of the substrate which is capable of causing electrostatic deposition of the particles onto the trailing edge of the substrate.

---

The present invention relates to an apparatus and to a method for depositing a powdery substance onto a specific area of a substrate. More particularly, the present invention relates to an apparatus and to a method for depositing substantially all of the particles of the powdery substance on the edge or edges of a substrate in preferential quantities to the amount of the powdery substance which may be deposited on areas of the substrate adjacent the edge or edges thereof. The apparatus and the method has specific applicability to the application of a structural adhesive to at least one of the materials of a laminated or sandwich structure.

The joining of a substrate material to an overlying material to provide a sandwich structure of superposed layers of materials may be done in an attempt to maximize the outstanding individual physical properties of the individual layers of material and to minimize less desirable physical properties of the individual layers of material. The joining together of the individual layers of material may be accomplished by various different means such as by bolting, riveting, soldering, brazing and the like. However, in situations where the weight of the resultant sandwich structure must be minimized, it does not appear to be practical to join the layers of material together by bolting, riveting, soldering, brazing and the like because of the weight introduced into the sandwich structure by such joining techniques.

In order to reduce the weight of the sandwich structure, the layers of material may be joined or bonded together by the use of adhesive materials. Adhesive materials such as structural adhesives adequately bond together the individual layers of material thereby providing a sandwich structure having reduced weight over a sandwich structure of the same materials joined together by bolting, welding and the like.

In applications where weight and strength are serious problems, such as in aircraft industry, adhesive bonded sandwich structures have a wide application. A typical sandwich construction used in the aircraft industry includes an apertured substrate, such as a metallic honeycomb substrate, faced with metallic sheet material bonded to both edges of the cells of the honeycomb substrate. The sandwich construction of a honeycomb substrate faced with a sheet material possesses a high strength-to-weight ratio. The strength of the sandwich construction may be traced to the honeycomb substrate which may be considered to be analogous to an I-beam in which the honeycomb substrate is expanded by reticulation until it is about the same as the width of the sheet material on either side of the honeycomb substrate.

A metal honeycomb substrate with metal facings bonded thereto may be used in cabin decks, bulkheads, wing and tail trailing edges, control surfaces, doors, access panels and the life for aircraft, partition panels for modular office construction and the like. A metal honeycomb substrate having non-metallic facings such as glass, wood, plastic, polystyrene foam, wall board and the like may be used as doors, partitions, furniture tops and the like. The honeycomb substrate may have substituted therefor other structures such as a corrugated means, other apertured means and the like.

Any structural adhesive suitable for bonding metal-to-metal or metal-to-non-metal may be used to bond together the layers of material of the sandwich construction. The form of the structural adhesive may be paste, powder, film, liquid and the like. The structural adhesive may be applied to that face of the sheet material to be bonded to the edge of the honeycomb substrate by any suitable technique such as by brushing, rolling, dusting, troweling and the like. In addition, the liquid type of structural adhesive may be atomized and entrained in air and deposited onto the sheet material or onto the honeycomb substrate.

Bonding of the sheet material to the honeycomb substrate may be accomplished by contacting the substrate with that face of the sheet material carrying the adhesive and subjecting the contacted surfaces to heat and pressure to provide a sandwich structure.

The above techniques of depositing the structural adhesive onto the sheet material may result in a layer of adhesive material extending between the spaced apart side walls of the honeycomb cell. In some instances, the thickness of the layer of structural adhesive extending between the spaced apart side walls of the honeycomb cell may be greater than the thickness of the sheet facing material bonded to the honeycomb substrate. The portion of the adhesive material which extends between adjacent side walls of the cell adds little, if anything, to the strength of the bond joint between the edge of the honeycomb substrate and the sheet material bonded thereto. Therefore, this portion of the adhesive material adds undesirable weight to the sandwich construction.

Fluidized beds using electrostatic deposition techniques have been proposed as a means for depositing powdered structural adhesives on the edges of apertured substrates. Structural adhesive powder deposited onto the edges of the apertured substrate, such as a honeycomb substrate, by an electrostatic fluidized bed appears to provide a deposit of the adhesive powder on the edge of the honeycomb substrate; however, undesirable amounts of the adhesive powder may also be found on the side walls of the cells of the honeycomb substrate. The adhesive powder on the side walls of the cells of the honeycomb substrate does not appear to assist in providing a bond joint between adjacent surfaces of the material of the sandwich structure and, therefore, the powder on the side walls adds undesirable weight to the sandwich structure. It is thought that the use of an electrostatic fluidized bed to deposit the adhesive powder onto the edge of the honeycomb substrate or onto the face of the sheet material which is to be bonded to the edge of the honeycomb substrate does not provide a significant reduction in weight of the sandwich structure over the prior art methods of brushing, rolling, dusting, troweling and the like.

Therefore, it is an object of the present invention to provide an apparatus and a method for overcoming the above-mentioned problems.

Another object of the present invention is to provide an apparatus capable of causing particles of a powdery substance to be deposited preferentialy onto an edge of a substrate.

A further object of the present invention is to provide an apparatus which is capable of causing the deposition of charged particles of a powdery substance onto an edge or edges of an apertured substrate.

Another object of the present invention is to provide a method for depositing particles of a powdery substance onto an edge of a honeycomb substrate.

Yet another object of the present invention is to provide an aluminum-structural adhesive-aluminum or aluminum alloy bond joint.

A further object of the present invention is to provide a non-metallic-structural adhesive-metallic bond joint.

Another object of the present invention is to provide an apparatus capable of depositing charged particles of a powdery structural adhesive onto an edge of a metallic honeycomb substrate.

Yet another object of the present invention is to provide a sandwich construction including a metallic honeycomb substrate having a sheet material bonded to at least one side of the substrate.

A further object of the present invention is to provide an electrostatic method for applying a powdery substance to a trailing edge of a substrate.

Another object of the present invention is to provide a bond joint between an elongated edge of a metallic substrate and a facing material wherein the bond joint is substantially uniform in thickness throughout.

Yet another object of the present invention is to provide an electrostatic method for applying a powdery adhesive material to a trailing edge of an apertured substrate which minimizes deposition of the powdery material on a leading edge and on the side wall surfaces of the apertures of the substrate.

A further object of the present invention is to provide a method for fabricating a sandwich structure in which a bonding material is confined substantially to the areas of contact between the abutting components of the sandwich structure and areas immediately adjacent thereto.

Another object of the present invention is to provide an electrostatic method for applying a powdery adhesive to a trailing edge of an apertured substrate which is economical to operate.

With the aforementioned objects enumerated, other objects will be apparent from reading the following description and the appended claims.

In the drawings:

FIG. 1 is a side view of an apparatus including a charged electrode for applying a powdery substance to a trailing edge of a substrate;

FIG. 2 is a side view of an apparatus including means for emitting charged particles of the powdery substance into a confined volume which charged particles are to be applied to the trailing edge of the substrate;

FIG. 3 is a perspective view of an apparatus including means for emitting charged particles of the powdery substance and a charged electrode which cooperate to cause deposition of the particles onto the trailing edge of the substrate;

FIG. 4 is a cross sectional view of a deposit of the powdery substance on the edge of the substrate;

FIG. 5 is a perspective view, with portions cut away, of an automated apparatus used to apply the powdery substance to an edge of a metallic honeycomb substrate;

FIG. 6 is a perspective view, with portions cut away, of a sandwich structure having a honeycomb core; and FIG. 7 is a cross sectional view of a bond joint between the end of a substrate and another material.

Generally speaking, the present invention relates to an apparatus and to a method for applying particles of a powdery substance to a trailing edge of a substrate. The apparatus my include means for emitting particles of a powdery substance toward the substrate. Substantially all of the particles are propelled beyond a leading edge of the substrate to the vicinity of a trailing edge of the substrate. Another means is adjacent the trailing edge of the substrate which is capable of promoting electrostatic deposition of the particles preferentially onto the trailing edge of the substrate.

An embodiment of the apparatus may include an electrode which is capable of charging the particles of the powdery substance which may have been propelled to the vicinity of the trailing edge of the substrate and capable of promoting deposition of the charged particles preferentially onto the trailing edge of the substrate.

A further embodiment of the apparatus may include a device which is capable of emitting charged particles of the powdery substance into a confined volume adjacent the trailing edge of the substrate. The charged particles accumulated in the confined volume tend to provide a charged distribution in space which is capable of promoting charged particles to be deposited preferentially onto the trailing edge of the substrate.

Another embodiment of the present invention may include the device for emitting the charged particles of the powdery substance, the confined volume, and the charged electrode. Means for defining the confined volume is adjacent the trailing edge of the substrate. The charged electrode may be located within the confined volume. The device emits particles of the powdery substance toward a leading edge of the substrate. Substantially all of the particles of the powdery substance are propelled past the leading edge of the substrate into the confined volume adjacent the trailing edge of the substrate. The confined volume and the charged electrode cooperate to provide a cloud of particles of the powdery substance from which the trailing edge of the substrate may be preferentially coated.

The method for applying particles of the powdery substance to the trailing edge of the substrate may include the step of passing the substrate between an electrically charged means and the device propelling the particles of powdery substance toward the substrate so that substantially all of the particles pass beyond the leading edge of the substrate to the vicinity of the electrically charged means. The method also includes the step of providing a cloud of the powdery substance adjacent the electrically charged means and the trailing edge of the substrate from which the particles of the powdery substance are electrostatically deposited, in a preferential manner, on the trailing edge of the substrate.

Referring now to FIG. 1 of the drawing, an apparatus for applying particles 12' of a powdery substance to a substrate 14 is indicated by the reference numeral 10'. The apparatus may include a device 11' for emitting uncharged particles 12' of the powdery substance and electrode means 20. The uncharged particles 12' are emitted toward the grounded substrate 14 having at least one conductive surface 14" on which the particles are to be deposited.

The electrode means 20 may be connected to a suitable high voltage D.C. power supply 15 capable of applying up to about 90 kilovolts or more to the electrode means. The device 11' may be connected to a suitable powder reservoir 16 through a The device 11' may be any suitable device capable of emitting particles 12' in a suitable entraining medium such as air and the like toward substrate 14. The movement of the medium entraining the particles 12' is sufficient to cause substantially all of the particles to pass by the leading edge 14' of the grounded substrate to the vicinity of the trailing edge 14" of the substrate.

The electrode means 20 may be positioned adjacent the trailing edge 14" of the grounded substrate 14. The electrode means 20 may be connected to the high voltage D.C. source 15 through cable 19.

The electrode means 20 is capable of charging the particles 12' in the vicinity of the trailing edge 14" of the substrate 14 and capable of promoting electrostatic deposion of the charged particles of the powdery substance onto the trailing edge 14" of the substrate.

FIG. 2 illustrates another embodiment of the present invention. The apparatus for applying particles of a charged powdery substance 12 is indicated by the reference numeral 10. The apparatus may include a device 11 for emitting charged particles 12 of the powdery substance toward the grounded substrate 14 and a closure 31. Note that the embodiment of the present invention illustrated in FIG. 2 does not include electrode means 20. The device 11 may be connected to the power supply 15 through cable 19 and to the powder reservoir 16 through hose 18. The power supply 15 is capable of applying up to about 90 kilovolts or more to the device 11.

The device 11 may be any suitable means capable of emitting particles 12 in an entraining medium such as air and the like toward the substrate 14 and capable of imparting a charge to the individual particles of the powdery substance as the particles are emitted by the device.

The movement of the medium entraining the charged particles 12 is sufficient to cause substantially all of the charged particles to pass the leading edge 14' of the substrate 14 to the vicinity of the trailing edge 14" of the substrate.

Closure 31 is positioned adjacent the training edge 14" of the ground substrate 14. The closure 31 provides a charged distribution in space such as a cloud 32 of the charged particles 12 which promotes electrostatic deposition of the charged particles onto trailing edge 14" of the substrate 14. The closure 31 is fabricated from any suitable material which is non-conductive.

Referring now to FIG. 3 of the drawing, another embodiment of apparatus for applying particles of a powdery substance is indicated by the reference numeral 10. The apparatus may include the combination of device 11 which emits charged particles 12 of a powdery substance and the electrode means 20. The device 11 of the apparatus 10 may be connected to the high voltage D.C. power supply 15 and to the power reservoir 16.

The device 11 may be any suitable device capable of emitting the particles 12 in a medium of entraining air and the like toward substrate 14 and capable of imparting a charge to the individual particles as the particles leave the device.

The powdery substance 12 may be entrained in a suitable medium such as air or the like by means of a pump (not shown) cooperatively associated with the powder reservoir 16 and delivered to the device 11 through any suitable means such as by conduit means 18. The particles 12 may be emitted or dispensed from the forward end of the device 11. The high voltage power supply 15 may be connected by the cable 19 to the device 11. The housing of the device 11 may be fabricated from a suitable, electrically, insulative material such as polyethylene or the like. Conductive portions (not shown) of the nozzle of the device 11 may be used to establish an electrostatic field adjacent the forward end of the device which is capable of charging the particles 12 of the powdery substance emitted by the device. Because of the high D.C. voltage associated with device 11, it may be desirable to maintain the quantity of conductive material at the forward end of the device at a minimum to reduce effective capacity thereof.

The advantages of minimizing effective capacity of device 11 are disclosed in U.S. Pat. No. 3,048,498. The safety features disclosed in that patent may be incorporated into device 11.

The D.C. high voltage source 15 preferably applies a voltage of negative polarity to the device 11 through cable 19. It should be understood that a voltage of positive polarity may be applied to device 11 rather than a negative voltage. The application of a voltage of negative polarity to device 11, tends to charge individual particles 12 of the powdery substance negatively. If a voltage of positive polarity is applied to device 11, the individual particles 12 tend to acquire a positive charge.

The charged particles 12 may be entrained in a suitable medium such as air or an inert gas medium. The movement of the medium entraining the charged particles 12 is sufficient to cause substantially all of the particles to pass by the leading edge 14' and the side wall surfaces of the grounded substrate 14 and move to the vicinity of the trailing edge 14" of the substrate.

The electrode means 20 may be positioned adjacent the trailing edge 14" of the grounded substrate 14. The electrode means 20 may be connected to the high voltage D.C. source 15 through resistor 21 and cable 19 and, therefore, charged by voltage of the same polarity used to charge the particles 12 emitted by device 11. The resistor 21 is connected between the high voltage source 15 and ground. The magnitude of voltage used to charge the electrode means 20 may be the same as or less than the voltage used to energize the device 11; the polarity of the voltage used to charge the electrode means 20 is the same as the polarity of the voltage used to energize device 11. The resistor 21 is used as a voltage divider resistor so as to provide a voltage to the electrode means 20 which is the same as or less than the magnitude of voltage applied to the device 11.

The charged particles 12 of the powdery substance tend to be repelled by the charged electrode means 20 since the particles and the electrode means carry a charge of the same polarity. The electrode means 20 assists in depositing the particles 12 onto the trailing edge 14" of the grounded substrate 14. It is thought that the particles 12 tend to deposit on the trailing edge 14" of the substrate 14 rather than on leading edge 14' or on the side area or wall of the substrate between the leading edge 14' and the trailing edge 14" due to the establishment of an advantageous combination of the movement of the medium used to entrain the powdery substance and the tendency of the electrostatic field to have a higher concentration at the edges of the substrate.

The substrate 14 may be any electrically conductive materia such as aluminum, magnesium, titanium, beryllium, iron, nickel, copper, silver, gold, chromium, tantalum, niobium, tungsten, molydbenum, chromium, zirconium, palladium, platinum, tin, manganese, alloys and composites thereof an dthe like; electrically conductive plastic materials; semiconductive materials which may be rendered electrically conductive by the application thereto of a slightly elevated voltage such as silicon, germanium and the like; and non-conductive materials which may be rendered electrically conductive by the application of heat such as lime glass, soda-lime glass, silicate glass, soda-lime-silica glass, alumino-silicate glass, soda-zinc glass, potash-lead glass, borosilicate glass and the like. The substrate 14 may also be an insulator such as any of the above-mentioned glasses or porcelain, plastic, wood, ceramics, and the like whose surfaces may be rendered electrically conductive by the application of an electrically conductive surface layer of the type disclosed in U.S. Pat. 3,236,679. The substrate may be a material having a surface oxide film which is electrically insulative such as silicon having a surface film of $SiO_2$, aluminum having a surface oxide film of $Al_2O_3$, tantalum having a surface oxide film of $Ta_2O_5$ and the like which may have their insulative surface rendered electrically conductive by the application of an electrically conductive surface layer of the type disclosed in U.S. Pat. 3,236,679.

To provide the purpose of the present invention, the powdery substance should be capable of being air entrained, of being electrically charged, and of adhering to the surface into which it is deposited. The powdery substance 12 may be a substance such as thermosetting resins, thermoplastic resins, elastomeric materials, admixtures thereof and the like. Suitable thermosetting resins are epoxies, phenolics, admixtures thereof and the like. Suitable thermoplastics resins are vinyls, polyamides, polyethylene, admixtures thereof and the like. Suitable elastomeric materials are neoprenes, nitriles, polysulfides, admixtures thereof and the like. Of the named powdery substances, the thermosetting resins are preferred. Admixtures of the resins and/or elastomeric materials may enhance the mechanical and the physical properties of the powdery substance. Suitable admixtures are epoxy-phenolic resins, epoxy-polyamide resins, epoxy-polysulfide resins, epoxy-silicones, phenolic-neoprenes, phenolic-nitriles, phenolic-vinyls, polyurethanes, and the like. Other powdery substances which may be deposited on the edge of the substrate may be refractory metal oxides and the like. Examples of suitable refractory metal oxides and the aluminum oxide, tungsten oxide, molybdenum oxide, zirconium oxide, magnesium oxide and the like.

Referring now to FIG. 4, a cross sectional view of substrate 14 is shown having the trailing edge 14" and an area immediately adjacent the trailing edge coated with a suitable powdery adhesive 12 such as an epoxy resin. The leading edge 14' and the sides of the substrate have little, if any, of the adhesive deposited thereon.

The substrate 14 may be pretreated so as to remove the contaminates from surfaces of the substrate which may effect bonding of the particles 12 of the powdery substance to the edge 14" of the substrate. The substrate may be cleaned by solvent wiping, bath immersion and the like. Chemicals which may be employed to clean the edges of the substrate include acetone, isopropyl alcohol, xylene, toluene and the like. Trichloroethylene may be used to degrease the substrate; however, care should be taken to remove residual traces of the solvent as trichloroethylene tends to inhibit the cure of most structural adhesives.

For purposes of illustration and not for purposes of limitation, a honeycomb substrate 30 is illustrated in FIG. 5. It should be recognized, however, that any suitable apertured substrate may be substituted for the honeycomb substrate 30 such as a corrugated substrate, a substrate having a plurality of circular, rectangular, square, pentagon cells and the like. A substrate having a plurality of honeycomb cells may be preferred because of its availability and high strength-to-weight ratio.

In situations where weight is a consideration, the honeycomb substrate 30 may be fabricated from any suitable lightweight material such as aluminum, beryllium, magnesium, titanium, alloys and composites thereof and the like and alloys such as stainless steel and the like. Of the several metallic materials aluminum, beryllium, alloys and composites thereof are preferred with aluminum being the most preferred metallic material.

The metallic material used to fabricate the honeycomb substrate 30 may be a foil material as thin as 1 mil. Generally, the foil material used in the honeycomb substrate is about 1 mil to about 10 mils or more thick. A foil material having a thickness of about 4 to about 10 mils is preferred for a honeycomb substrate. The individual cell size of the honeycomb substrate may be ⅛, 3/16, ¼, ⅜, ½ of an inch and larger. The individual cells of the honeycomb substrate may be a regular hexagon or an irregular hexagon. If the cells of the honeycomb substrate are irregular hexagons, the cells may be about 3/16 inch across the width of the cell and about ½ inch across the the length of the cell. The depth of the honeycomb cell may vary considerably. For example, the honeycomb cell depth may be from about ¼ inch to about 4 inches or more with a depth of about ¾ to about 4 inches being preferred when using the instant deposition technique. It is thought that the ratio of the cell size to the cell depth should be about 1 to 1 to about 1 to 10 or more to afford advantageous use of the deposition techniques of the present invention. It is thought that the deeper the cell depth, the higher the velocity of the individual particles of powdery substance should be in order to propel the particles to the trailing edge of honeycomb substrate.

In an embodiment of the particle deposition process as practiced by the present invention, a substantially continuous length of honeycomb substrate 30 may be passed through a confining volume as defined by closure 31. The closure may be fabricated from any suitable, electrically insulative material such as plastic, wood, fiberboard, cardboard and the like. The honeycomb substrate should be electrically grounded.

The length and width dimensions of the closure 31 appear to be of little consequence. However, the depth of the closure 31 appears to be of some consequence. The distance from the trailing edge 30" of the honeycomb substrate 30 to rear wall 33 of the closure 31 should be sufficient to permit the formation of a cloud 32 of the charged powdery substance between the rear wall 33 and the trailing edge 30" of the honeycomb substrate 30. Nevertheless, the distance between the trailing edge 30" of the honeycomb substrate 30 and the rear wall 33 of the closure 31 may vary widely. The distance between the cells of the honeycomb substrate 30 and the rear wall 33 of the closure may be from about 3 inches to about 20 inches or more with a spacing of about 3 to about 18 inches between the rear wall of the closure and the trailing edge 30" of the honeycomb substrate being preferred when the honeycomb substrate is fabricated from aluminum and has irregular hexagon cells having a width of about 3/16 of an inch and a length of about ½ inch and a cell depth of about ¾ of an inch and when device 11 is energized by a voltage of about 90 kv. The distances specified above from the rear wall 33 of the closure to the trailing edge 30" of the substrate may vary as the dimensions of the cells of the honeycomb substrate vary and/or as the material used to fabricate the honeycomb substrate is a material other than aluminum.

The phrase "trailing edge" as used herein denotes the edge of the substrate furthest removed from the forward end of device 11 and does not denote the movement, if any, of the honeycomb substrate 30. The phrase "leading edge" as used herein denotes the edge of substrate closest to the forward end of device 11. The phrase "rear wall 33" is used to denote the wall of the closure 31 furthest removed from the viewer when the view looks down into the closure.

To assist in the depositing of the particles 12 onto the trailing edge 30" of the substrate 30, electrode means 20 may be placed in the area between the rear wall 33 and the trailing edge 30" of the honeycomb substrate 30. The electrode means 20 may be in spaced, substantially parallel relationship with the honeycomb substrate 30. The distance between the electrode means 20 and the rear wall 33 of the closure 31 appears to be of little consequence; however, the separation between the rear wall 33 and the electrode means should be such so as to reduce the possibility of dielectric breakdown of the medium between the electrode means and the rear wall.

The distance between the electrode means 20 and the trailing edge 30" of the honeycomb substrate 30 seems to be of some consequence assuming that all other variable distances are held constant within their preferred range. Distances of about 3 to about 18 inches and more between the trailing edge 30" of the honeycomb substrate and the electrode means 20 appear to function satisfactorily. The minimum distance between the honeycomb substrate and the electrode means is limited to some extent by the dielectric strength of the medium therebetween. A preferred distance between the trailing edge 30" of the honeycomb substrate 30 and the electrode means seems to be about 5 to about 12 inches with a spacing of about 6 to about 10 inches being most preferred when the honeycomb substrate is fabricated from aluminum and has irregular hexagonal cells having a width of about 3/16 of an inch and a length of about 1/2 inch and a cell depth of about 3/4 of an inch and when device 11 and electrode means 20 are charged to a voltage of about 90 kv. The distances specified above from the electrode means 20 to the trailing edge 30" of the substrate may vary as the dimensions of the cells of the honeycomb substrate vary and/or as the material used to fabricate the honeycomb substrate is a material other than aluminum.

The electrode means 20 may be any one of several configurations such as a plate of solid conducting material, a series of needle-like points, a foraminous structure such as screen grid and the like. The foraminous electrode seems to provide a more uniform electric field and seems to permit the medium entraining the particles 12 to pass therethrough while repelling the particles toward the trailing edge 30" of the substrate 30. Furthermore, the particles 12 appear to have a lesser tendency to deposit on the foraminous structure than several of the other types of electrode configurations; therefore, the foraminous electrode structure is preferred.

The distance between the nozzle of device 11 and the leading edge 30' of the honeycomb substrate 30 appears to be of some consequence with all other variable distances held constant within their preferred range. Assuming that the honeycomb substrate is fabricated from aluminum and that it has irregular hexagonal cells having a width of about 3/16 of an inch and a length of about 1/2 inch and a cell depth of about 3/4 of an inch and that device 11 and electrode means 20 are energized by a voltage of about 90 kv. at a current of about 200 microamperes, spacing of the forward end of the device 11 about 4 inches or less from the leading edge 30' of the substrate 30 appears to result in a heavy but fairly uniform deposition of the powdery substance 12 on the trailing edge 30" of the substrate. Moving the forward end of the device 11 to about 5 to about 10 inches from the leading edge 30' of the honeycomb substrate 30 appears to result in a substantially uniform deposition of powdery substance 12 on the trailing edge 30" of the honeycomb substrate 30. It should be noted that the distance from the forward end of the device 11 to the leading edge 30" of the substrate may vary as the dimensions of the cells of the honeycomb substrate vary and/or as the material used to fabricate the honeycomb substrate is a material other than aluminum.

The depth of the deposit appears to vary inversely as the distance of the forward end or nozzle of device 11 varies from the leading edge 30' of the honeycomb substrate 30 assuming substantially uniform deposition time. For example, when the forward end of the device 11 is about 4 inches from the leading edge 30' of the substrate 30, the deposit of powdery substance 12 appears to be about 10 to about 15 mils deep after about 2 to 3 seconds. The deposit of powdery substance 12 appears to be about 2 to about 5 mils deep after 2 or 3 seconds when the forward end of the device 11 is spaced about 10 inches from the leading edge 30' of the honeycomb substrate 30. A substantially uniform deposit of powdery substance 12 having a depth of about 5 to about 7 mils appears to be deposited on the trailing edge 30" of the honeycomb substrate 30 after 2 or 3 seconds when the forward end of the device 11 is spaced about 6 to 9 inches from the leading edge 30' of the honeycomb substrate 30. The distance of the forward end of device 11 from the leading edge 30' of the substrate 30 necessary to achieve a substantially uniform deposit of powdery substance on the edge 30" thereof depends on, among other considerations, the dielectric strength of the medium between the forward end of device 11 and the leading edge 30' of the substrate 30, the type of powdery substance to be deposited, the depth of the deposit required in order to satisfy the intended use to which the deposit is to be put, the delivery rate of the powdery substance to the device 11, the voltage supplied to the device 11 and the like. For example, if the powdery substance 12 is a structural adhesive which is intended to bond aluminum or an alloy or composite of aluminum to the trailing edge 30" of the honeycomb substrate 30, a deposit of an adhesive powder from about 4 to 15 mils or more thick may be necessary to provide an adequate bond joint.

Bond joints of other thickness may be necessary for bonding together other types of materials. The bond joint should be substantially uniform over all contacting edges in order to optimize the adhesive properties of the adhesive material. Furthermore, it appears that if the bond joint is excessively thick, the holding power of the adhesive may be reduced, and if the bond is too thin, the bond joint may be spotty and the holding power of the adhesive may be reduced.

Movement of an aluminum honeycomb substrate 30 having the dimensions described hereinbefore with respect to the forward end of the device 11 at a rate of about 1 to about 5 inches per second appears to result in satisfactory deposition of the powdery substance onto the substrate. Movement of the honeycomb substrate is in the direction of arrow 22. The rate of movement of the honeycomb substrate with respect to the forward end of the device 11 at a rate of about 2 to 3 inches per second is preferred. The device 11 may cover an area about 10 inches wide. The preferred rate of movement of the honeycomb substrate is suggested with all variable distances of the components of the apparatus within their preferred range and with device 11 and electrode means 20 at voltage of about 90 kv.

The forward end of the device 11 may be moved back and forth across the honeycomb substrate 30 in the direction of arrows 23 and 23' so as to cover a wider honeycomb substrate, that is, one greater than 10 inches wide. Alternatively, a plurality of fixed devices 11 may be used to cover the width of the honeycomb substrate 30 rather than to cause a single device 11 to reciprocate across the substrate.

A more satisfactory coating of the trailing edge 30" of the substrate 30 appears to take place when the trailing edge of the substrate is substantially horizontal and the axis of the forward end of device 11 is perpendicular to the plane of the trailing edge of the substrate. It is contemplated that the particles 12 emitted by the device 11 may be dispensed either downwardly or upwardly toward the substrate 30. It is thought that the particles 12 emitted by the device in the downward direction as shown in FIG. 5 would be preferred.

The particle size of the powder substance appears to be of some importance. Generally, it appears that coarse powder tends to possess better deposition characteristics than fine powder. For example, a powder having a particle size of between about 100 to about 300 microns appears to deposit more uniformly on the trailing edge of the substrate than does a powder having a particle size between about 1 and about 75 microns. Therefore, although deposition of particles of powdery substance having a particle size of less than 75 microns may be realized using the apparatus illustrated in the several figures, it is preferred that the particle size of the powder be about 100 microns or more. A powdery substance having a particle size of between about 100 and 200 microns is most preferred. An admixture of particles having a particle size ranging between 100 and 300 microns appears to have about the same deposition characteristics as a powdery substance having particles of one size.

The device 11 for emitting the particles of powdery substance illustrated in FIG. 5 may be either automatically operated devices or manually operated devices capable of applying the powdery substance to the substrate 30. A preferred manual device is a Model 322/8446 hand gun distribured by Ransburg Electro-Coating Corp. The nozzle attached to the hand gun may be a non-rotating diffuser capable of providing a flat fan spray. A suitable nozzle may be Part 10711 distributed by Ransburg Electro-Coating Corp.

The device 11 is connected to the D.C. high voltage power supply 15 which is capable of providing a voltage of negative polarity of up to about 90 kilovolts (kv.) at a current of up to about 200 microamperes. The voltage supplied to device 11 by D.C. power source 15 may be varied from about 25 kv. to about 90 kv. or more. A supply voltage of about 45 kv. to about 90 kv. is preferred with a supply voltage of about 90 kv. (D.C.) being the most preferred. The deposition of the powdery substance on the trailing edge 30″ of the honeycomb substrate 30 with the device voltage at about 25 kv. negative polarity appears to result in a variable deposit of powder on the trailing edge 30″ of the substrate. Increasing the voltage applied to the device 11 to about 45 kv. negative polarity appears to increase the charge carried by the individual particles 12 and to provide a more uniform deposit of the powder on the trailing edge 30″ of the honeycomb substrate 30; further increasing the voltage applied to the device 11 to about 90 kv. appears to provide a substantially uniform deposit of the powder on the trailing edge 30″ of the honeycomb structure. Increasing the voltage supplied to the device 11 beyond about 90 kv. does not appear to result in a more uniform deposit of the powder onto the trailing edge 30″ of the substrate 30.

The device 11 and the electrode 20 each may be energized from separate powder supplies, however, to reduce the number of power supplies required by the apparatus, the electrode means 20 may be connected to D.C. high voltage power supply 15 and charged to about the same magnitude to which the devices 11 are charged. For example, if the voltage supplied to the devices 11 is about 90 kv., the voltage supplied to the electrode means 20 may be about 90 kv. or less depending on the voltage feed thereto by the voltage divider 21. A voltage of about 45 to about 90 kv. applied to electrode means 20 appears to result in a more uniform deposition of the powdery substance 12 than does the application voltage of about 25 kv. to the electrode means 20.

The voltage divider 21 is connected between the high voltage D.C. power supply 15 and ground. It is seen that the voltage applied to the electrode means 20 may be the same as or less than the magnitude of voltage applied to device 11. However, the polarity of the voltage applied to the electrode means 20 is the same as the polarity of the voltage applied to device 11.

The powdery substance 12 may be delivered to the devices 11 from a suitable powder reservoir 16 which may include a vibrator in the base thereof for agitating the powdery substances contained therein which may be difficult to fluidize. The powdery substance 12 may be supplied to the device 11 by a suitable venturi type pump (not shown) having a nozzle pressure ranging from about 10 to about 60 pounds per square inch (p.s.i.) at a powder delivery rate of about 125 to about 400 grams per minute. It appears that if the pressure at the nozzle of the pump drops below a value which reduces the velocity of the particles of the powdery substance to a value less than about 125 feet per minute at the leading edge of the substrate or if the pressure at the nozzle of the pump exceeds a value which increases the velocity of the particles of the powdery substance to more than about 600 feet per second at the leading edge of the substrate the amount of the powder substance 12 deposited onto the trailing edge 30″ of the substrate 30 is reduced. A velocity of the medium of about 125 to about 600 feet per minute range appears to be sufficient to cause the particles 12 to be propelled past the leading edge 30′ and across the side surfaces of the honeycomb substrate 30 to the vicinity of the electrode means 20 without experiencing undesirable deposition of the particles of the powdery substance on the leading edge 30′ or in the cells of th honeycomb structure 30.

The following example is illustrative of electrostatically depositing particles of a powdery substrate onto the trailing edge of a substrate.

EXAMPLE

An aluminum honeycomb substrate having a cell size of about 3/16 inch by about ½ inch and about ¾ inch deep is electrically grounded and suspended adjacent the open end of a closure. The substrate is spaced about 14 inches from the rear wall of the closure. The trailing edge of the substrate in the horizontal position. The dimensions of the closure are about 16 inches by about 14 inches and about 16 inches deep. The side walls and the end wall of the closure are fabricated from an electrically insulative material. An electrostatic hand gun capable of dispensing charged particles of a powdery substance is connected to a high voltage direct current source capable of supplying a negative voltage of about 90 kv. (kilovolts) to the gun. The forward end of the hand gun is spaced about 8 inches above the leading edge of the honeycomb substrate. The axis of the gun is substantially perpendicular to the horizontal trailing edge of the substrate. An electrode means including at least two wires is placed in the closure about 8 inches from the trailing edge of the honeycomb substrate. The adjacent wires of the electrode means are about 5 inches apart. The electrode means is supplied with a negative voltage of about 90 kv. A suitable epoxy resin powder having a particle size of about 100 microns is delivered to the gun at a delivery rate of about 300 grams per minute and a pump nozzle pressure sufficient to propel the particles of powdery substance at a velocity of about 450 feet per minute at the vicinity of the leading edge of the substrate. Charged epoxy resin particles are dispensed from the nozzle of the gun toward the honeycomb substrate in entraining air. The charged epoxy resin particles tend to be propelled beyond the leading edge of the honeycomb substrate, that is the edge of the honeycomb structures nearest to the gun, into the confined volume adjacent the trailing edge of the honeycomb substrate. The negatively charged particles entrained in air tend to be repelled by the negative charged carried by the electrode means toward the trailing edge of the honeycomb substrate. Moving the honeycomb core at a rate of about 2 to 3 inches per second past the nozzle of the gun appears to result in a substantially uniform deposit of the epoxy resin powder on the trailing edge of the honeycomb substrate having a depth of about 5 to about 7 mils.

After applying a uniform deposit of the powdery substance to the trailing edge of the substrate, the powdery substance may be sintered to the edge of the substrate by the application of a sutiable elevated temperature for an adequate period of time. The substrate then may be rotated through 180° so that the uncoated edge of the substrate may be coated by the apparatus. The powdery substance most recently deposited may be sintered to the substrate by the application of a suitable elevated temperature for an adequate period of time. Sintering a powdery substance such as epoxy resin to the substrate permits handling and storage thereof until use is desired without the material being thermally, fully cross-linked. For example, a honeycomb substrate having adhesive powder fused to its edges may be stored until such time as it is desired to face the honeycomb substrate with a metal foil or sheet such as aluminum, an alloy or composite material thereof and the like without having harmful amounts of the powder separating from the edges of the substrate.

Generally, structural adhesives such as thermosetting resins like epoxy resin require heat and pressure to cross-link the adhesive and provide a satisfactory bond joint between adjacent layers of the sandwich structure. The temperature to which the adhesive is subjected is generally about 300° to about 350° F. for a few seconds to 4 hours or more. The pressure to which the layers to be bonded together are subjected should be uniform and constant. The pressure to which the joint is subjected may range from contact pressure to about 500 p.s.i. or more. Most commercially available adhesives cure at a temperature of about 330° to about 350° F. which curing temperature is applied for about 30 to 120 minutes. The pressure applied to the bond joint for most commercially available adhesives is of about 25 to about 300 p.s.i. It should be noted that the time interval for heating and the application of pressure may vary proportionally with temperature. For example, heating the structural adhesive to a temperature of about 600° F. may require about 3 seconds to provide a satisfactory bond joint while heating the same structural adhesive to a temperature of about 250° F. may require about 4 hours to provide a satisfactory bond joint.

FIG. 6 shows an aluminum honeycomb sandwich 60. In the sandwich, a substrate 30 of aluminum having a wall thickness of about 10 mils may be faced with aluminum sheets 40 and 41 having a thickness of about 20 mils to about 750 mils. The aluminum sheet may be bonded to the edges of the honeycomb substrate 30 by an epoxy-phenolic adhesive 42 applied to the edges of the substrate using the electrostatic deposition techniques outlined hereinbefore. Note the absence of the adhesive 42 extending completely across the area between adjacent side walls of the honeycomb cells.

FIG. 7 illustrates the bond joint between a side wall 50 of the honeycomb substrate 30 and sheet 40. Note the illustration of a positive meniscus between the epoxy-phenolic adhesive 42 and the sheet 40 and the wall 50 indicating wetting of surfaces of the joined material indicating a good bond between the jointed materials.

The present invention is not intended to be limited by the disclosure therein, changes and modifications may be made by those skilled in the art without departing from the spirit and scope of the present invention. Such modifications are considered to be within the purview and scope of the present invention and the appended claims.

Having thus described our invention we claim:

1. A method for applying particles of a powdery substance to an edge of a substrate having leading and trailing edges comprising,
    passing the substrate by a device emitting particles of the powdery substance entrained in a gaseous medium toward the substrate,
    propelling substantially all of the particles past the leading edge of the substrate, and
    electrostatically depositing particles of the powdery substance preferentially onto the trailing edge of the substrate so that the leading edge has little, if any, of the powdery substance deposited thereon.

2. The method of claim 1, including, prior to electrostatically depositing the particles, providing a cloud of charged particles adjacent the trailing edge of the substrate.

3. The method of claim 2, including the further step of confining the cloud of charged particles substantially within a closure.

4. A method for applying particles of a powdery substance to an edge of an apertured substrate having leading and trailing edges comprising, passing the apertured substrate between a charged electrode and a device emitting charged particles of the powdery substance toward the substrate, propelling substantially all of the charged particles past the leading edge of the substrate, providing a cloud of the charged particles emitted by the device adjacent the trailing edge of the substrate, and electrostatically depositing particles from the cloud of charged particles preferentially onto the trailing edge of the apertured substrate so that the leading edge has little, if any, of the powdery substance deposited thereon

5. The method of claim 4, wherein the apertured substrate is a honeycomb substrate.

6. The method of claim 4, wherein the substrate is a material with a trailing edge surface capable of being rendered electrically conductive.

7. The method of claim 4, wherein the powdery substance is a structural adhesive.

8. The method of claim 7, including the further step of fusing the deposited powdery substance to the edge of the apertured substrate.

9. In a method for fabricating a sandwich structure comprising:

applying a powdery structural adhesive to an edge of the substrate using the method of claim 4, providing a facing material contiguous to the edge of the substrate coated with the powdery structural adhesive and heating the powdery structural adhesive whereby the adhesive provides a bond joint between the facing material and the substrate.

10. A method of manufacturing a sandwich structure including a facing material bonded to an edge of an apertured substrate, the method comprising the steps of preferentially depositing particles of a powdery structural adhesive entrained in a gas on a trailing edge of the apertured substrate by moving the apertured substrate through a confined volume and emitting charged particles of the powdery adhesive toward a leading edge of the apertured substrate, propelling the charged particles by the leading edge of the apertured substrate and forming a cloud of charged particles in the confined volume, depositing charged particles from the cloud preferentially onto the trailing edge of the apertured substrate so that the leading edge has little, if any, of the powdery substance deposited thereon, and then bonding the facing material to the trailing edge of the apertured substrate by applying heating to the deposited adhesive particles.

11. The method of claim 10, wherein the step of bonding the sheet material to the trailing edge of the apertured substrate includes the steps of providing the facing material contiguous to the edge of the apertured substrate coated with the powdery adhesive and heating the powdery substance to provide a bond joint between the facing material and the dge of the apertured substrate.

12. The method of claim 10, including the further step of, prior to depositing the particles of powder substance on the edge of the aperture, moving the apertured substrate between a device emitting the charged particles of the powdery adhesive and an electrode in the confined volume, the voltage applied to the electrode being different from the voltage applied to the device.

13. A method of manufacturing a sandwich structure including a facing material bonded to an edge of a honeycomb substrate, the method comprising the steps of preferentially depositing particles of a powdery structural adhesive entrained in gas a trailing edge of the honeycomb substrate having leading and trailing edges by moving the honeycomb substrate through a confined volume and forming a cloud of charged particles of the structural adhesive in the confined volume from particles propelled by the leading edge of the substrate, depositing charged particles from the cloud preferentially onto the trailing edge of the honeycomb substrate so that the leading edge has little, if any, of the powdery substance deposited thereon, and then bonding the facing material to the edge of the honeycomb substrate carrying the deposited particles of adhesive particles by applying heat to the deposited particles.

14. The method of claim 13, including the further steps of, prior to bonding the facing material to the edge of the honeycomb substrate carrying the particles, fusing the structural adhesive particles to the edge of the substrate and then preferentially depositing particles of the powdery adhesive entrained in gas on the uncoated edge of the honeycomb substrate by moving the substrate through the confined volume and forming a cloud of charged particles in the confined volume, charged particles being preferentially deposited onto the heretofore uncoated edge of the apertured substrate, and bonding facing material to each edge of the apertured substrate upon which powdery material is deposited.

References Cited
UNITED STATES PATENTS

| | | | |
|---|---|---|---|
| 2,559,225 | 7/1951 | Ransburg | 117—93.42 |
| 2,893,894 | 7/1959 | Ransburg | 117—93.42 |
| 2,898,279 | 8/1959 | Metcalfe et al. | 117—93.4 |
| 3,090,353 | 5/1963 | Holt, Jr. et al. | 118—621 |
| 3,128,544 | 4/1964 | Allingham | 161—68 |
| 3,160,524 | 12/1964 | Kaiser | 118—621 X |
| 3,380,845 | 4/1968 | Shapiro et al. | 117—93.4 |
| 2,786,006 | 3/1957 | Ferverda | 156—283 |
| 3,211,253 | 10/1965 | Gonzalez | 161—68 UX |

BENJAMIN R. PADGETT, Primary Examiner

E. E. LEHMANN, Assistant Examiner

U.S. Cl. X.R.

117—93.4; 156—283; 272, 320; 161—68

UNITED STATES PATENT OFFICE
CERTIFICATE OF CORRECTION

Patent No. 3,692,606　　　　　　　　　　Dated September 19, 1972

Inventor(s) Emery P. Miller, et al.

It is certified that error appears in the above-identified patent and that said Letters Patent are hereby corrected as shown below:

Column 1, line 14, "for" should read -- of --.

Column 1, line 16, "may include" should read -- includes --

Column 1, line 27, "for" should read -- of --.

Column 1, line 29, "for" should read -- of --.

Column 2, line 38, "may result" should read -- results --.

Column 2, line 62, after "does not" delete "appear to".

Column 3, line 9, "for" should read -- of --.

Column 3, line 20, "for" should read -- of --.

Column 3, line 49, "for" should read -- of --.

Column 3, line 54, "for" should read -- of --.

Column 4, line 9, "for" should read -- of --.

Column 4, line 11, "my include" should read -- includes --.

Column 4, line 19, "may include" should read -- includes --

Column 4, line 25, "may include" should read -- includes --

Column 4, line 71, "may be" should read -- is --.

Column 4, line 74, "may be" should read -- is --.

UNITED STATES PATENT OFFICE
CERTIFICATE OF CORRECTION

Patent No. 3,692,606     Dated September 19, 1972

Inventor(s) Emory P. Miller, et al.

It is certified that error appears in the above-identified patent and that said Letters Patent are hereby corrected as shown below:

Column 5, line 8, "may be" should read -- is --.

Column 5, line 10, "may be" should read -- is --.

Column 5, line 20, "may include" should read -- includes --

Column 5, line 25, "may be" should read -- is --.

Column 5, line 48, after "substance" delete "is indicated by reference numeral 10".

Column 5, line 49, "may include" should read -- includes --

Column 5, line 52, "10 may be" should read -- is --.

Column 5, line 65, "may be" should read -- is --.

Column 6, line 23, "may be" should read -- is --.

Column 6, line 25, "may be" should read -- is --.

Column 8, line 14, "may be" should read -- is --.

Column 8, line 58, "may be" should read -- is --.

Column 8, line 60, "may be" should read -- is --.

Column 11, line 9, "may be" should read -- is --.

Column 11, line 56, "may be" should read -- is --.

Column 11, line 60, "may be" should read -- is --.

Singed and sealed this 26th day of March 1974.

(SEAL)
Attest:

EDWARD M. FLETCHER, JR.
Attesting Officer

C. MARSHALL DANN
Commissioner of Patents